United States Patent [19]
Endo

[11] Patent Number: 5,863,094
[45] Date of Patent: Jan. 26, 1999

[54] SADDLE FOR BICYCLE

[75] Inventor: Yoichi Endo, Tokyo, Japan

[73] Assignee: YoE Institute Co., Ltd., Tokyo, Japan

[21] Appl. No.: 881,385

[22] Filed: Jun. 24, 1997

[30] Foreign Application Priority Data

Jun. 24, 1996 [JP] Japan .................................. 8-181677

[51] Int. Cl.⁶ ................................................. B62J 1/00
[52] U.S. Cl. ...................... 297/201; 297/195.1; 297/312
[58] Field of Search ............................... 297/195.1, 201, 297/312

[56] References Cited

U.S. PATENT DOCUMENTS

| | | | |
|---|---|---|---|
| 603,734 | 5/1898 | Peck et al. | 297/201 |
| 615,223 | 11/1898 | Peck | 297/201 |
| 3,446,532 | 5/1969 | Camer | 297/312 |
| 4,387,925 | 6/1983 | Barker et al. | 297/201 |
| 4,541,668 | 9/1985 | Rouw | 297/201 |

FOREIGN PATENT DOCUMENTS

| | | | |
|---|---|---|---|
| 3529702 | 3/1987 | Germany | 297/201 |
| 5747585 | 3/1982 | Japan . | |
| 3185790 | 11/1988 | Japan . | |
| 6463482 | 3/1989 | Japan . | |
| 25872 | of 1896 | United Kingdom | 297/201 |
| 2121740 | 1/1984 | United Kingdom | 297/201 |

*Primary Examiner*—Laurie K. Cranmer
*Attorney, Agent, or Firm*—Browdy and Neimark

[57] ABSTRACT

The present device provides a novel saddle for a bicycle, which eliminates the risk of pain caused by oppression of the regions near the hip or the perineal regions, and ensures an agreeable riding.

The front sides of the saddle has a shape projecting forward in the traveling direction of the bicycle from the front center portion, and at least the saddle displacement member including the projecting front sides is displaceable relative to the bicycle main body. The body weight of the bicycle rider can therefore be supported in a dispersed state over a wide range of the hip and the femoral regions. The hip, particularly the regions near the coccyx are not locally oppressed seriously.

6 Claims, 9 Drawing Sheets

SADDLE FOR BICYCLE

BACKGROUND OF THE INVENTION

1. Field of the Invention

The present invention relates to a saddle for a bicycle. More particularly, the present invention relates to a saddle for a bicycle which ensures amenity of a rider of a bicycle and improvement of traveling ability of the bicycle.

2. Description of the Related Art

Bicycles are now attracting general attention from the point of view not only of practical use, but also of aesthetic and health-keeping because they are free from pollution and requires human power to some extent. More recently, bicycle races such as bicycle road races and triathlons incorporating bicycle riding as part thereof are actively held, and the bicycle is increasingly attracting the general attention.

The most serious problem posed when riding a bicycle for a long period of time is oppression onto the hip from the saddle.

Figure 9:
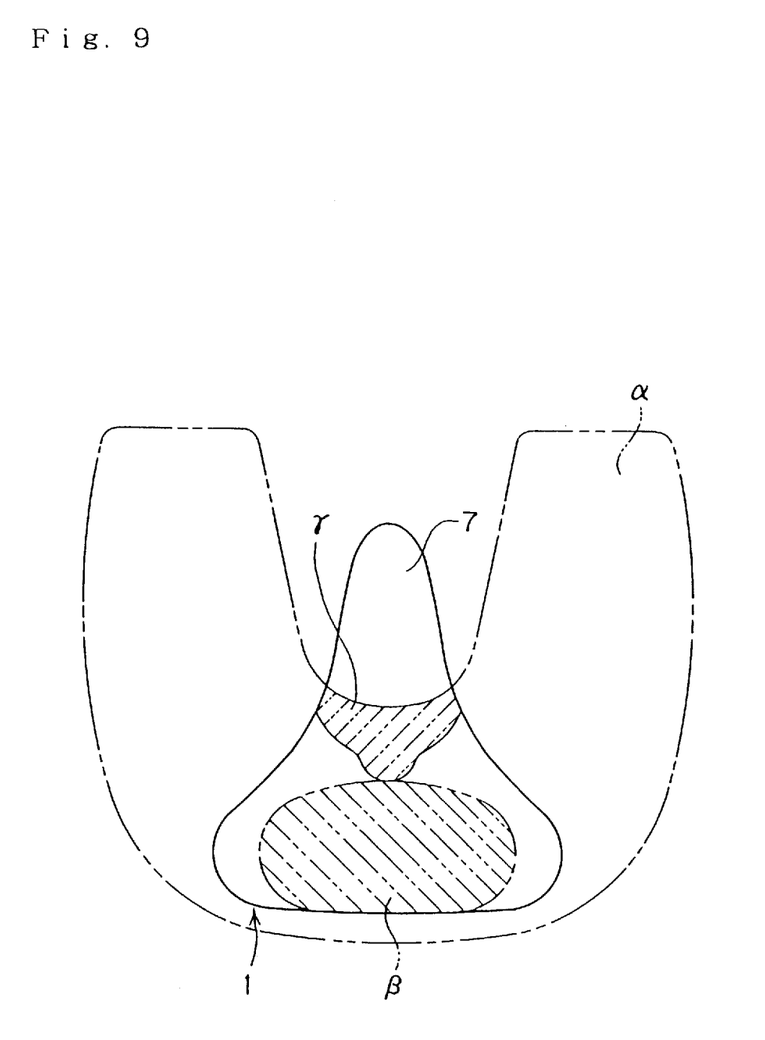
FIG. 9 is a plan view of a conventional saddle for a bicycle as viewed from above.

For example, FIG. 9 is a plan view of a saddle of a conventional bicycle as viewed from above, and illustrates the positional relationship between the saddle represented by 1 and the hip of a rider represented by $\alpha$. As is clear from FIG. 1, the pressure-receiving area of the conventional saddle 1 is very small as compared with the hip of the rider $\alpha$, and this causes a serious oppression of the hip by the saddle 1.

More specifically, most of the body weight of the rider $\alpha$ is supported by the saddle 1 at such a very small portions near the coccyx of the rider, represented by $\beta$, and near the perineal region of the rider $\alpha$, represented by $\gamma$. As a result, oppression is large in regions near the coccyx $\beta$ and near the perineum, and along with the lapse of riding time, oppression on regions near the coccyx $\beta$ and near the perineal region generally leads to pain, and eventually becomes unbearable.

Particularly in the case of a rider of a racing bicycle requiring the rider to take a forward inclining posture, the oppression onto the perineal region poses a serious problem: oppression onto a portion near the perineal region necessarily leads to oppression onto the urethra which in turn causes urethral pain or dysuria which has long been a difficult problem.

As is clear from FIG. 9, a conventional saddle has no member for basically supporting the femoral region under this region. When riding for a long period of time, therefore, this causes the problem of occurrence of pain at the joint of the femoral regions.

In addition, the saddle 1 has a front center portion 7 projecting forward which corresponds to the hip joint region. Every time the rider works the pedals, therefore, the inner sides of the thighs of the rider rub against the projecting front center portion 7, thus resulting in soreness in the thighs.

Effects to reduce the weight of the bicycle itself and to improve the transmission mechanism have actively been made. For the saddle, however, it has been the general practice to follow the old unchanged shape unconsciously. Under these circumstances, a rider of a bicycle, particularly a racing bicycle, who rides for a long period of time, while feeling discontented with the saddle of the conventional design, considers it unavoidable, and rides the bicycle for a long time or participates in a race while bearing his pain at regions near the coccyx or the perineal region, or further, thigh soreness or pain at the femoral region, and facing the risk of urethral pain or dysuria.

SUMMARY OF THE INVENTION

The present invention has therefore an object to provide a saddle for a bicycle, which basically improves the shape and structure of the saddle for a bicycle, and for $\alpha$ the bicycle, particularly one riding for a long period of time such as a rider of a racing bicycle, does not cause pain at regions near the coccyx or the perineal region, permitting an agreeable tour, and eventually allows improvement of the traveling ability of the bicycle.

To achieve the foregoing object, in the saddle for a bicycle of the present invention, front sides of the saddle are formed into a shape projecting forward in the traveling direction of the bicycle from the front center portion, and at least a saddle displacement member containing the projecting front sides is provided displaceably through a movable member relative to the saddle main body.

DESCRIPTION OF THE PREFERRED EMBODIMENTS

In the saddle for a bicycle of the present invention, front sides of the saddle have a shape projecting in the traveling direction of the bicycle from a front center portion thereof so that the saddle displacement member containing the projecting front sides and the saddle main body support a wide range of a rider of the bicycle including the femoral region and the hip. The body weight of the rider of the bicycle is therefore dispersed throughout a wide range, and the hip, particularly the regions near the coccyx are never subject to a strong oppression.

In this specification, the term "saddle main body" or "rear portion" shall mean the portion of a saddle which is secured to a saddle prop, unless otherwise specified.

Unlike a conventional bicycle saddle, because of the absence of the front center portion projecting well forward as shown in FIG. 9, the saddle of the present invention never oppresses the perineal region of the rider.

Furthermore, since the saddle displacement members supporting the right and left femoral regions are displaceable relative to the saddle main body by means of a movable member, motion of the femoral portions for pedaling is never prevented.

These right and left saddle displacement members may comprise only projections of the right and left sides, or may comprise wider portions including projections of the right and left sides, respectively.

When the right and left saddle displacement members comprise wider portions including the projections of the right and left sides, respectively, the right and left saddle displacement members may previously be divided into a plurality of mutually displaceable saddle displacement members. This is advantageous when causing the entire shape of the saddle to fit with the motion of the femoral regions and the hip. In this case, at least the entire right and left saddle displacement members or any of the saddle displacement members divided into a plurality of portions must be displaceable lightly by following the motion of the femoral region so as to permit pedaling with no trouble. The configuration may also be such that the right and left saddle displacement members and any of the plurality of saddle displacement members, or the plurality of saddle displacement members, cooperate to follow the motion of the femoral regions to ensure light displacement.

In order to make the right and left saddle displacement members displaceable relative to the saddle main body, or in order to make the plurality of divided saddle displacement members mutually displaceable, it suffices to connect the saddle displacement members and the saddle main body, or the plurality of divided saddle displacement members, mutually displaceably via a movable member. For example, these may be connected mutually rotatably by means of a rotation shaft, or a hinge may be employed. The saddle displacement member and the saddle main body, or the divided saddle displacement members may be connected with a flexible member having elasticity such as a rod spring or a leaf spring, or a flexible member having elasticity may be provided between the saddle displacement member and the saddle main body, or between the divided saddle displacement members.

In the absence of an external force, the right and left saddle displacement members and the plurality of divided saddle displacement members should preferably have a restoring force to return to at least the original positions thereof. However, if the restoring force is too strong to allow the saddle displacement members projecting to the right and left, supporting the femoral regions to return to the original positions, this may hinder sound pedaling. Therefore, the restoring force of the saddle displacement members or the plurality of divided saddle displacement members to ensure light displacement to cope with the motion of the femoral regions should preferably be of the order of overcoming the own weight of the saddle displacement members. The other saddle displacement members, or the other divided saddle displacement members should preferably have usually a relatively strong restoring force to the extent that these members are allowed to support the hip and follow a large motion of the hip and the femoral regions, for example, at stoppage of the bicycle.

In the saddle for a bicycle of the present invention, a back can be provided on the rear portion of the saddle. When providing a back on the rear portion of the saddle, the reaction force to the legs during pedaling the bicycle can be received by the back on the rear portion of the saddle, thus permitting effective transmission of the pedaling force with the rear portion of the saddle as the fulcrum. If the saddle main body is oscillably bearing-supported around a horizontal shaft extending in the right and left direction at right angles to the traveling direction of the bicycle, the reaction force received by the legs upon pedaling can be effectively received.

There is no particular limitation on the material of the saddle for a bicycle of the present invention. Applicable materials include a hard vinyl chloride, hard plastics excellent in impact resistance such as polycarbonate, ABS, polyester and polyamide, composite materials reinforced by fiber reinforcing materials such as glass fiber and carbon fiber, and metallic materials such as aluminum and titanium alloys. Elasticity may be imparted to the surface by laminating a soft material such as vinyl chloride, nylon, rubber or leather on the hard material.

The saddle surface may be formed into a shape having convex and concave portions in agreement with the shapes of the hip and femoral regions to achieve better fitting of the saddle with the hip and the femoral regions of the rider of the bicycle.

Now, the present invention will be described below with reference to the drawings.

Figure 1:
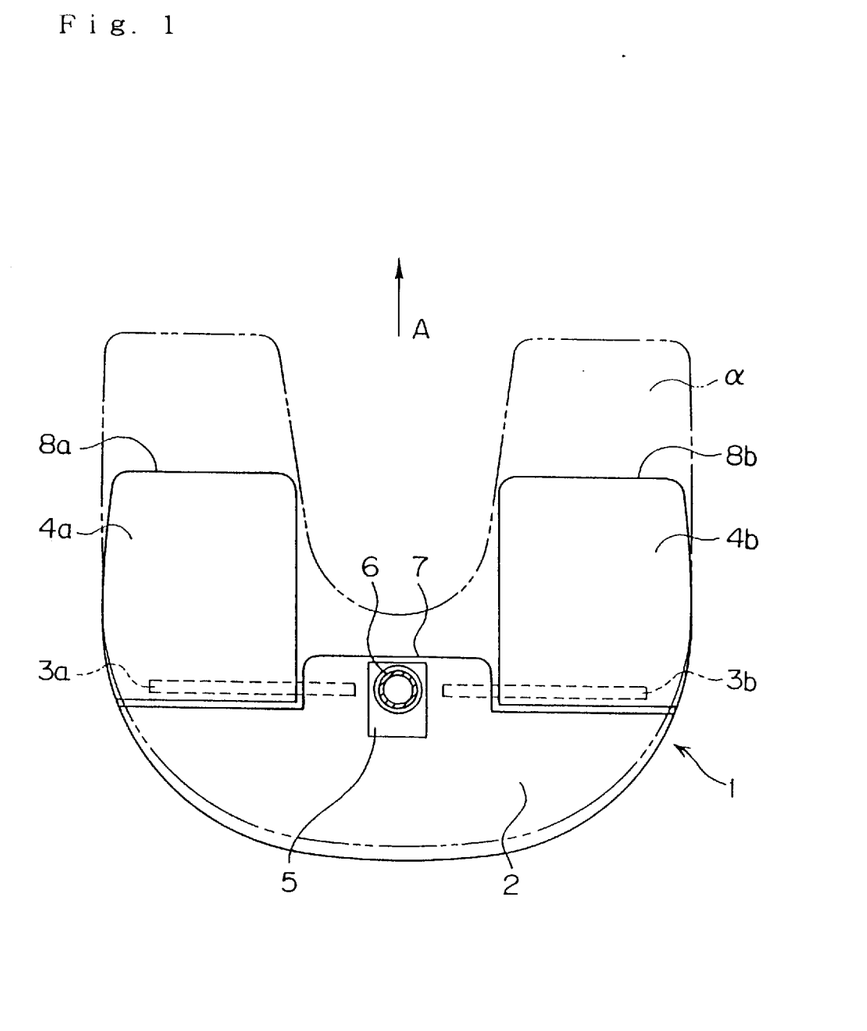
FIG. 1 is a bottom view of an embodiment of the saddle for a bicycle of the present invention as viewed from below.

FIG. 1 is a bottom view illustrating an embodiment of the saddle for a bicycle of the present invention as viewed from below.

In FIG. 1 is a saddle comprising a saddle main body or rear portion 2, and a right and a left saddle displacement members 4a and 4b supported displaceably by movable members 3a and 3b, and attached to a saddle prop 6 of a bicycle main body by means of an attachment member 5 provided under the saddle main body 2.

In the embodiment shown in FIG. 1, the movable members 3a and 3b of the saddle displacement members 4a and 4b are configured rotatably by means of respective rotation shafts and bearings. The movable members 3a and 3b are attached to a position in the rear of the front center portion 7 of the saddle main body 2 in the bicycle traveling direction. A coil spring is provided around the rotation shaft of each of the movable members 3a and 3b, and when no external force acts on the saddle displacement members 4a and 4b supported by the movable members 3a and 3b, a restoring force is imparted to the saddle displacement members 4a and 4b so as to always keep the horizontal position. The means to impact this restoring force is not limited to a coil spring, but may be a leaf spring.

The right and left saddle displacement members 4a and 4b in the embodiment shown are formed into a shape respectively containing front sides 8a and 8b projecting forward in the traveling direction of the bicycle from the front center portion 7 of the saddle main body 2.

For attachment of an attachment member 5 of the saddle main body 2 and the saddle prop 6 of the bicycle main body, it suffices to adopt convention attachment means such as screw connection.

As is clear from the comparison of FIGS. 1 and 9, the saddle for a bicycle of the present invention supports the hip and the femoral regions of the rider α of the bicycle with a wider area than the conventional saddle for a bicycle. With the saddle for a bicycle of the present invention, therefore, in which the body weight of the rider α of the bicycle is supported by the saddle 1 with the hip and the femoral regions in dispersion over a wide area, the regions near the coccyx are never strongly oppressed locally. Furthermore, the saddle of the present invention does not unnecessarily oppress the perineal region of the rider α because of the absence of a projection of the front center portion 7 in the conventional saddle shown in FIG. 9.

Figure 2:
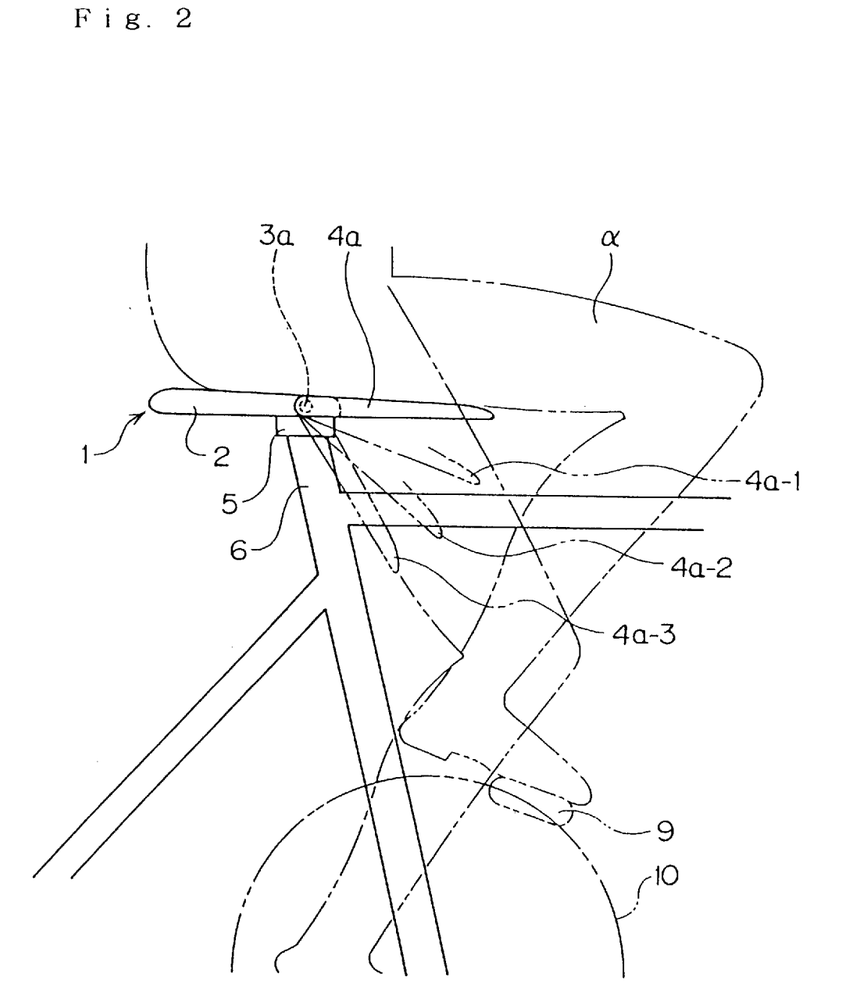
FIG. 2 is a side view of the saddle for a bicycle of the present invention.

FIG. 2 is a side view of the saddle shown in FIG. 1, illustrated together with a partial schematic view of the bicycle main body.

The saddle displacement members 4a-1, 4a-2 and 4a-3 virtually represent the positions after rotation and displacement of the saddle displacement member 4a around the movable member 3a relative to the saddle main body 2. This suggests that the saddle displacement member 4a does not hinder the motion of the femoral regions of the rider α of the bicycle during pedaling.

The reference numeral 10 represents the rotation locus of the pedal 9.

Figure 3:
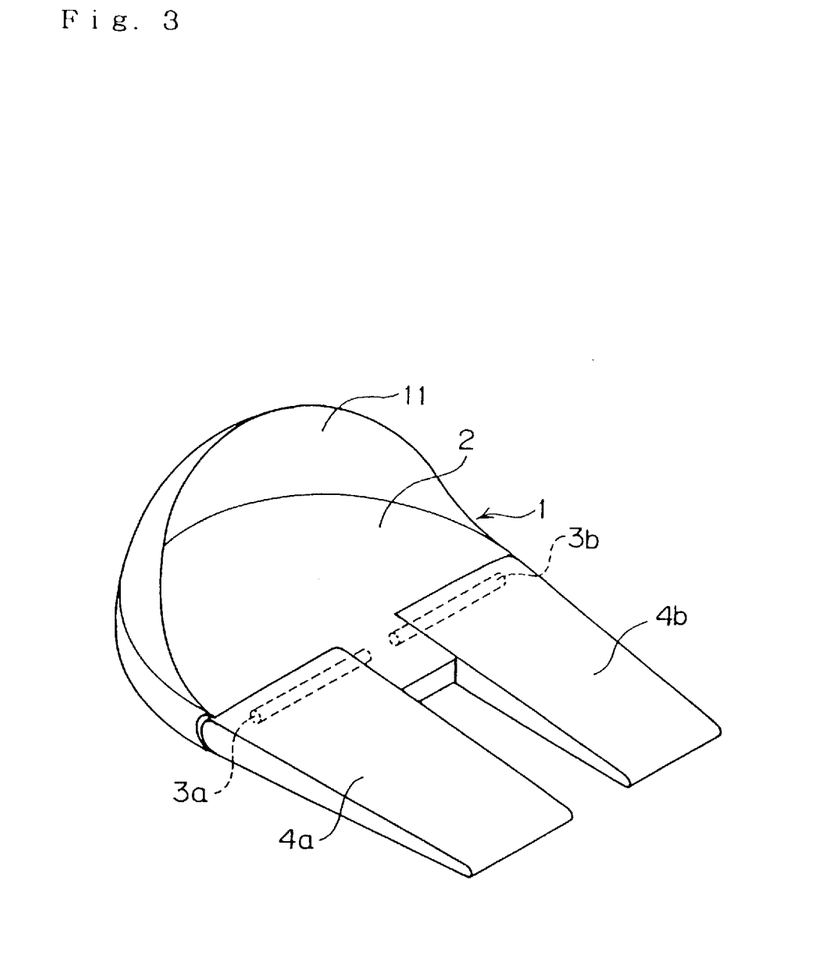
FIG. 3 is a perspective view of the saddle for a bicycle of the present invention.

FIG. 3 is a perspective view of the saddle for a bicycle of the present invention shown in FIGS. 1 and 2.

In this embodiment, the saddle displacement members 4a and 4b and the saddle main body 2 have flat surfaces, but may be curved surfaces having concave or convex portions in agreement with the shapes of the hip and the femoral regions in contact with these parts.

The reference numeral 11 represents a back provided on the rear portion of the saddle 1.

Figure 4:
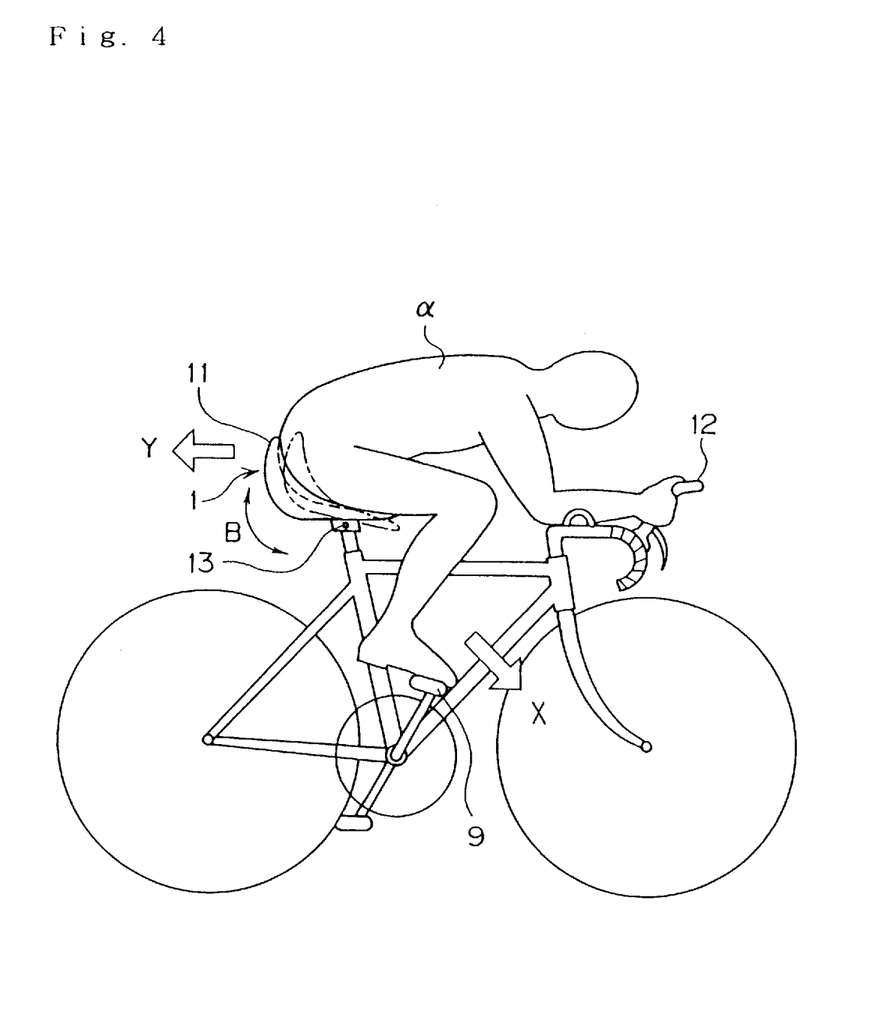
FIG. 4 is a conceptual diagram illustrating the relationship between the saddle for a bicycle of the present invention and reaction force.

FIG. 4 illustrates an embodiment of the saddle for a bicycle of the present invention, in which a back is provided, together with a bicycle main body and a rider α.

As is clear from FIG. 4, the force of the rider a for pedaling 9 acts in the arrow X direction, and the rider α naturally receives a reaction force in a direction counter to the arrow X direction. Conventionally, the reaction force has been received by strongly grasping the handle 12 of the bicycle with the two hands, and holding the position of the upper part of the body in standstill by the force of arms and the force of the upper part of the body. Therefore, every time the force is applied to the legs for pedaling, the arms and the upper part of the body are strained, forming an important cause of fatigue.

As shown in FIG. 4, however, when the saddle 1 has a back 11, part of the reaction force received by the legs, i.e., the horizontal component acting in the arrow Y direction, is received effectively by the back 11. As a result, it is no more necessary to apply additional force to the upper part of the body or the arms, thus largely reducing fatigue of the rider α.

When the entire saddle 1 is oscillably supported as indicated by the arrow B around a horizontal shaft 13 extending in the right/left direction at right angles to the traveling direction of the bicycle, application of a force onto the pedal 9 in the arrow X direction causes the saddle 1 to oscillate to the position shown by the two-point chain line, and a major portion of the reaction force received by the rider α can be effectively received by the back 11.

Figure 5:
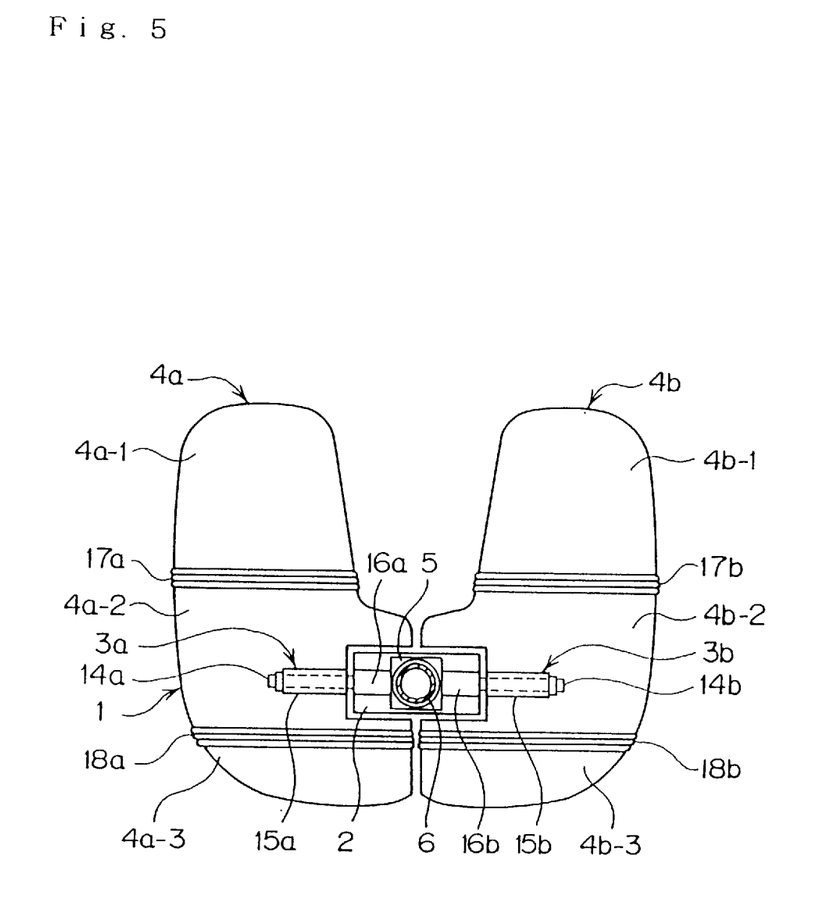
FIG. 5 is a bottom view of another embodiment of the saddle for a bicycle of the present invention as viewed from below.

FIG. 5 is a bottom view illustrating another embodiment of the saddle for a bicycle of the present invention as viewed from below.

The saddle main body 2 secured to the saddle prop 6 by an attachment member 5 in this embodiment is minimized in size, and surrounded by the saddle displacement members 4a and 4b. The saddle displacement members 4a and 4b are rotatably and displaceably attached to the saddle main body by means of movable members 3a and 3b represented as rotation shafts 14a and 14b, respectively. Reference numerals 15a and 15b are bearings rotatably holding the rotation shafts 14a and 14b, respectively, and 16a and 16b are holding members of the rotation shafts 14a and 14b, attached to the saddle main body 2. It is needless to mention that the holding members 16a and 16b may be configured as bearings and the bearings 15a and 15b, as holding members.

Reference numerals 17a, 17b, 18a and 18b are movable members made of an elastic and flexible material. The saddle displacement members 4a and 4b are divided into three mutually displaceable saddle displacement members 4a-1, 4a-2 and 4a-3 and saddle displacement members 4b-1, 4b-2 and 4b-3, respectively, by these movable members 17a and 18a, and the movable members 17b and 18b.

Figure 6:
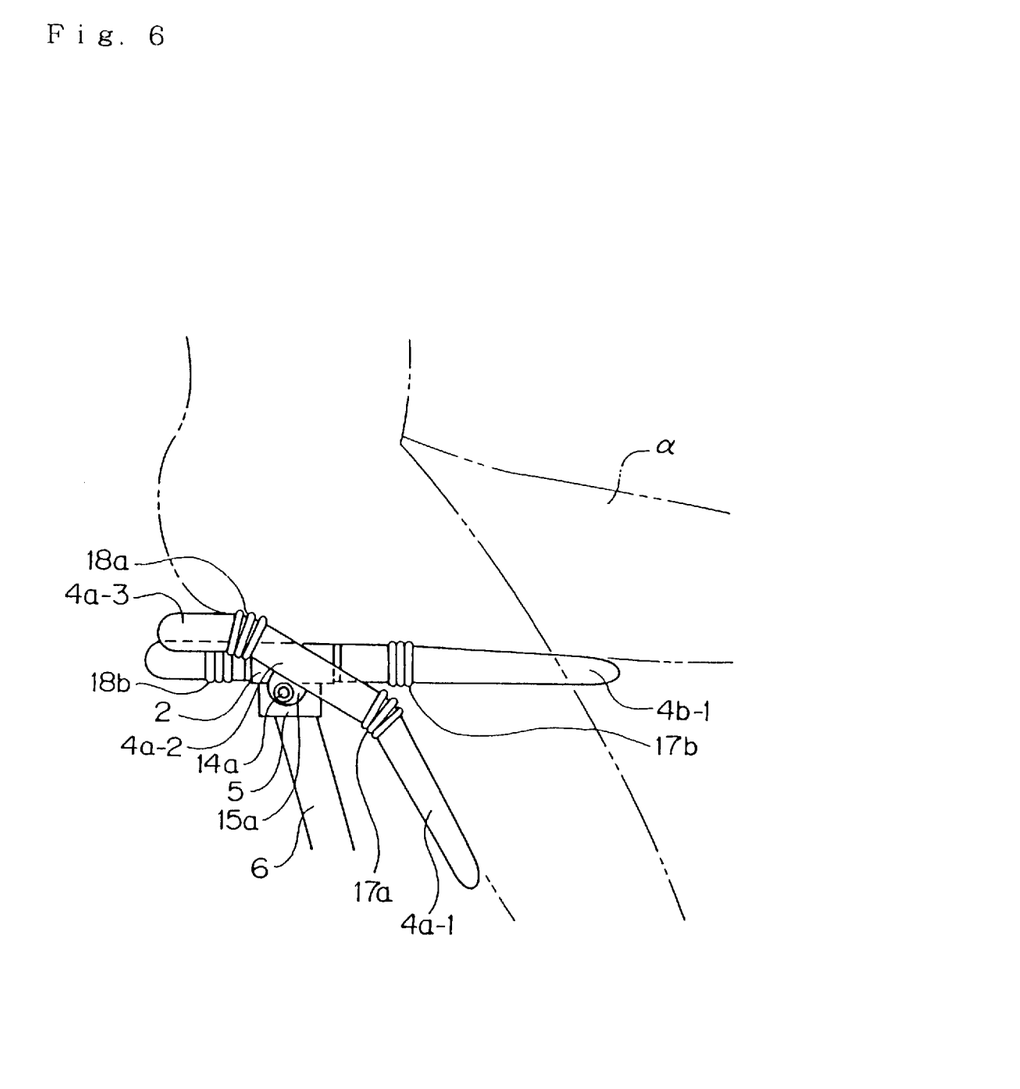
FIG. 6 is a side view of the saddle for a bicycle of the present invention as viewed from a side.

Mutual motion of these sets of three saddle displacement members 4a-1, 4a-2 and 4a-3 and the saddle displacement members 4b-1, 4b-2 and 4b-3, and the saddle displacement members 4a and 4b will be easily understood from FIG. 6.

More specifically, FIG. 6 is a side view of the saddle for a bicycle of FIG. 5 as viewed from a side.

As is clear from FIG. 6, the motion of the femoral regions of the bicycle rider α during pedaling is followed with no trouble by the cooperation of the rotational displacement of the saddle displacement member 4a relative to the saddle main body 2 and the mutual displacement of the saddle displacement member 4a-1 formed by dividing the saddle displacement member 4a relative to the saddle displacement member 4a-2. The mutual displacement between the saddle displacement members 4a-3 and 4a-2 effectively prevents unnecessary lifting of the rear portion of the saddle displacement member 4a caused by the rotational displacement of the saddle displacement member 4a relative to the saddle main body 2.

In the embodiment shown in FIGS. 5 and 6, the saddle displacement members 4a and 4b are made of a hard plastics having a satisfactory impact resistance, and the flexible members composing the movable members 17a, 17b, 18a and 18b are made of a soft and elastic plastic material integrally formed with the hard plastics composing the saddle displacement members 4a and 4b. The means for making mutually displaceable the divided saddle displacement members 4a-1, 4a-2 and 4a-3 and the saddle displacement members 4b-1, 4b-2 and 4b-3 is not limited to this, but may be a notch or a groove. When the restoring force is insufficient with a soft and elastic plastics alone or with a groove or a notch alone, supplementary means such as a spring may be employed.

Figure 7:
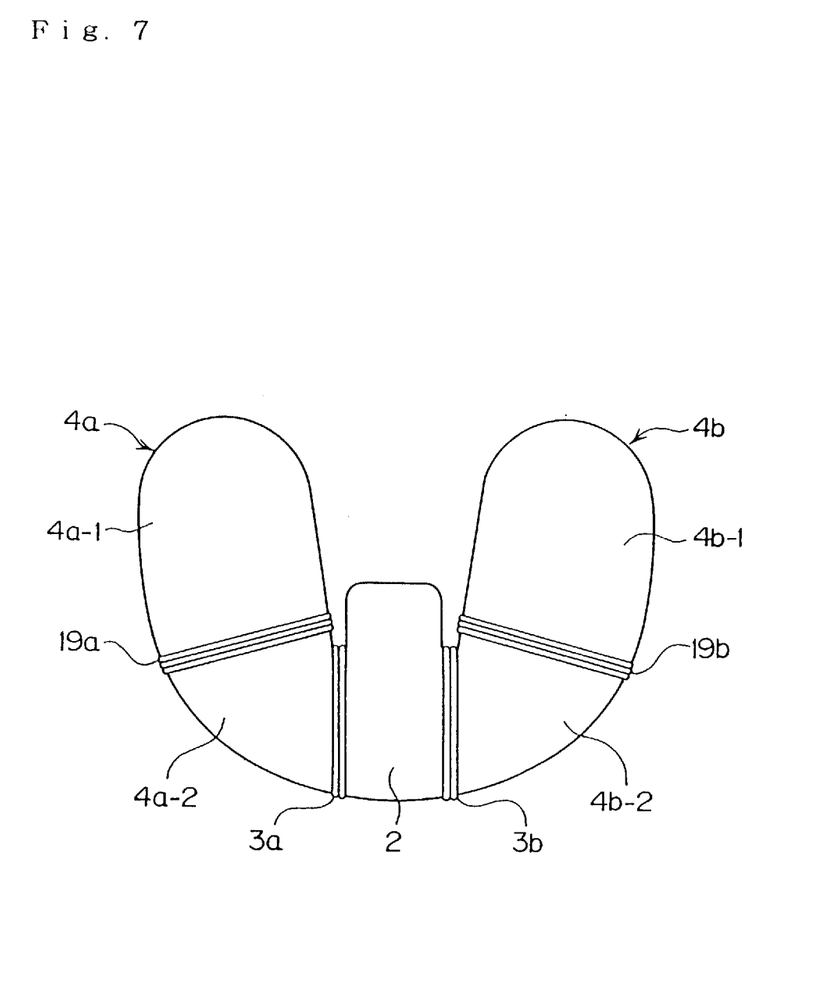
FIG. 7 is a bottom view of further another embodiment of the saddle for a bicycle of the present invention as viewed from below.

FIG. 7 is a bottom view of another embodiment of the saddle for a bicycle of the present invention as viewed from below.

In this embodiment, the saddle displacement members 4a and 4b are displaceably connected to the saddle main body 2 by movable members 3a and 3b made of a relatively hard and flexible material having a strong restoring force, and are divided into two sets of saddle displacement members 4a-1 and 4a-2, on the one hand, and 4b-1 and 4b-2, on the other hand, respectively. The motion of the femoral regions of the bicycle rider α is basically ensured by a light displacement of the saddle displacement members 4a-1 and 4b-1.

While the movable members 3a and 3b made of a flexible material are in parallel with the traveling direction of the bicycle, the movable members 19a and 19b made of a flexible material slightly deviate from a direction at right angles to the traveling direction of the bicycle. As is clear from FIG. 7, the both sides of the saddle incline toward the rear of the bicycle traveling direction. By thus providing an angle to the movable members 19a and 19b, the amount of rotational displacement of the outer portion of the saddle displacement members 4a-1 and 4b-1 becomes larger than that of the inner portion, thus alleviating the hindrance of the motion relative to the outer side of the femoral regions of the bicycle rider α as compared with the case in which the movable members 19a and 19b are simply at right angles to the traveling direction of the bicycle. In addition, when the entire saddle displacement members 4a and 4b displace relative to the saddle main body 2 under the effect of the movable members 3a and 3b made of the flexible material, the amount of rotational displacement of the outer portion of the saddle displacement members 4a-1 and 4b-1 becomes further larger than that of the inner side, thus further alleviating the hindrance of the motion to the outer portion of the femoral regions of the bicycle rider α.

In this embodiment, furthermore, the relatively hard and flexible members having a strong restoring force, which compose the movable members 3a and 3b, make almost no displacement during usual riding and are therefore effective for supporting the body weight of the bicycle rider α. When the femoral regions go down more than usual upon stoppage, for example, the movable members 3a and 3b follow this motion and never prevent smooth motion.

Figure 8:
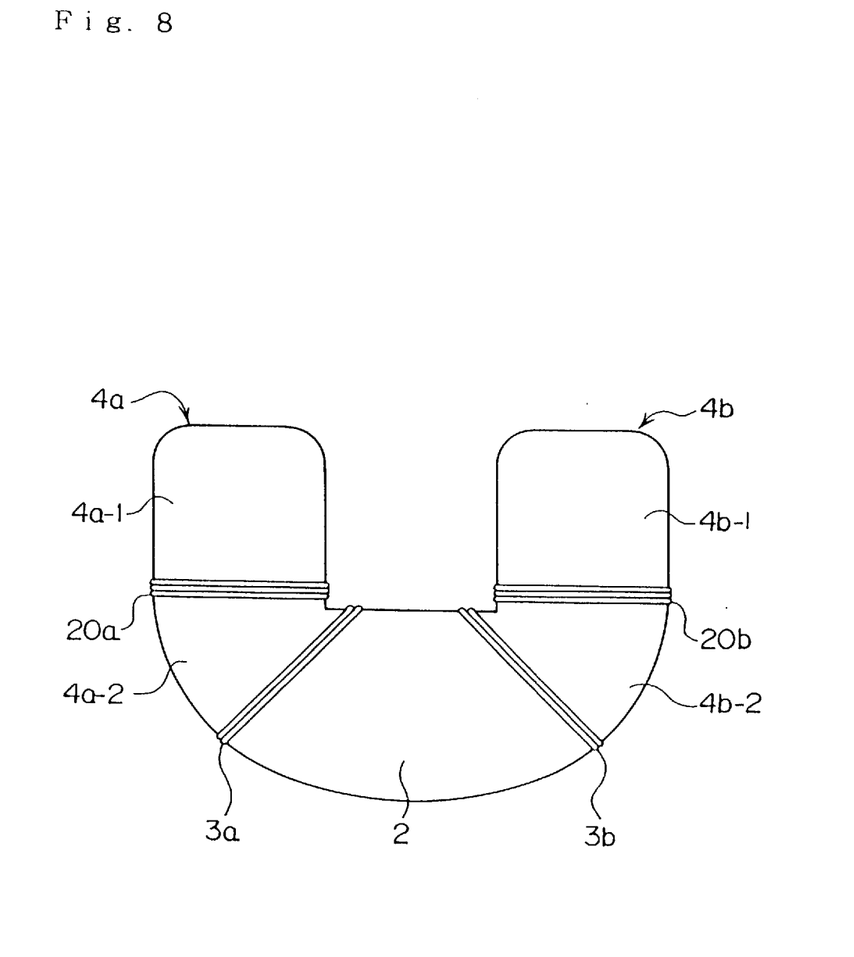
FIG. 8 is a bottom view of further another embodiment of the saddle for a bicycle of the present invention as viewed from below.

FIG. 8 is a bottom view illustrating further another embodiment of the saddle for a bicycle of the present invention as viewed from below.

In this embodiment, the saddle displacement members 4a and 4b are divided into a set of saddle displacement members 4a-1 and 4a-2 and another set of saddle displacement members 4b-1 and 4b-2 by movable members 20a and 20b made of a relatively soft and flexible material, and displaceably connected to the saddle main body 2 by movable members 3a and 3b of a relatively hard and flexible material having a strong restoring force, at an angle to the traveling direction of the bicycle.

Because the flexible material composing the movable members 3a and 3b is relatively hard and has a strong restoring force as described above, the body weight of the rider α can be effectively supported during usual riding. As an angle is provided to the bicycle traveling direction, the motion of the femoral regions can be satisfactorily followed and the motion is never prevented even upon stoppage or pedaling the bicycle with the femoral regions largely brought down.

According to the saddle for a bicycle of the present invention, as described above, the front sides of the saddle has a shape projecting forward in the traveling direction of the bicycle from the front center portion, and at least the saddle displacement member including the projecting front sides is displaceable relative to the bicycle main body. The body weight of the bicycle rider can therefore be supported in a dispersed state over a wide range of the hip and the femoral regions. The hip, particularly the regions near the coccyx are not locally oppressed seriously. In addition, because of the absence of a front center projection unlike in a conventional saddle, there occurs no thigh sore, and regions near the perineal region are not unnecessarily oppressed. The saddle for a bicycle of the present invention therefore eliminates the risk of pain at regions near the hip or the perineal region even during riding for a long period of time, and ensures an agreeable riding, thus providing useful effects.

The saddle for a bicycle of the present invention has a back on the rear portion thereof. The reaction force received by the legs during pedaling can therefore be effectively received, and to such an extent, the force can be effectively transmitted to the pedals, thus permitting display of an excellent traveling ability, thus providing another useful effect.

The saddle for a bicycle of the present invention liberates a bicycle rider from the pain at regions near the hip which has so far been believed to be unavoidable, permits an agreeable tour and brings about further improvement of the traveling ability.

What is claimed is:

1. A saddle for a bicycle comprising a body portion adapted to be rigidly fixed to a bicycle, said body portion comprising a projecting center portion having a front part;

a pair of front side portions projecting forwardly on opposite sides of said center portion, each of said front side portions having two hinge axes extending thereacross, a first said hinge axis (3a, 3b) connecting each of said front side portions to said body portion (2), and a second said hinge axis (19a, 19b, 20a, 20b) connecting one part (4a-1, 4b-1) of each said front side portion to another part (4a-2, 4b-2) of each said front side portion, said two hinge axes of each said front side portion being not parallel to one another.

2. A saddle for a bicycle according to claim 1, wherein said front side portions are provided with a restoring force for returning at least to the original position thereof.

3. A saddle for a bicycle according to claim 2, wherein said restoring force varies for each part of the front side portions.

4. A saddle for a bicycle according to claim 1, wherein said saddle has a back on a rear part thereof.

5. A saddle according to claim 1 wherein said front part of said center portion extends forward in front of said hinge axes.

6. A bicycle seat according to claim 1 wherein said hinge axes comprise hinges of elastic and flexible material.

* * * * *